Feb. 12, 1929.
L. W. MOULTON
1,702,229
CANDLE ASSEMBLING MACHINE
Filed Feb. 20, 1928  13 Sheets-Sheet 4
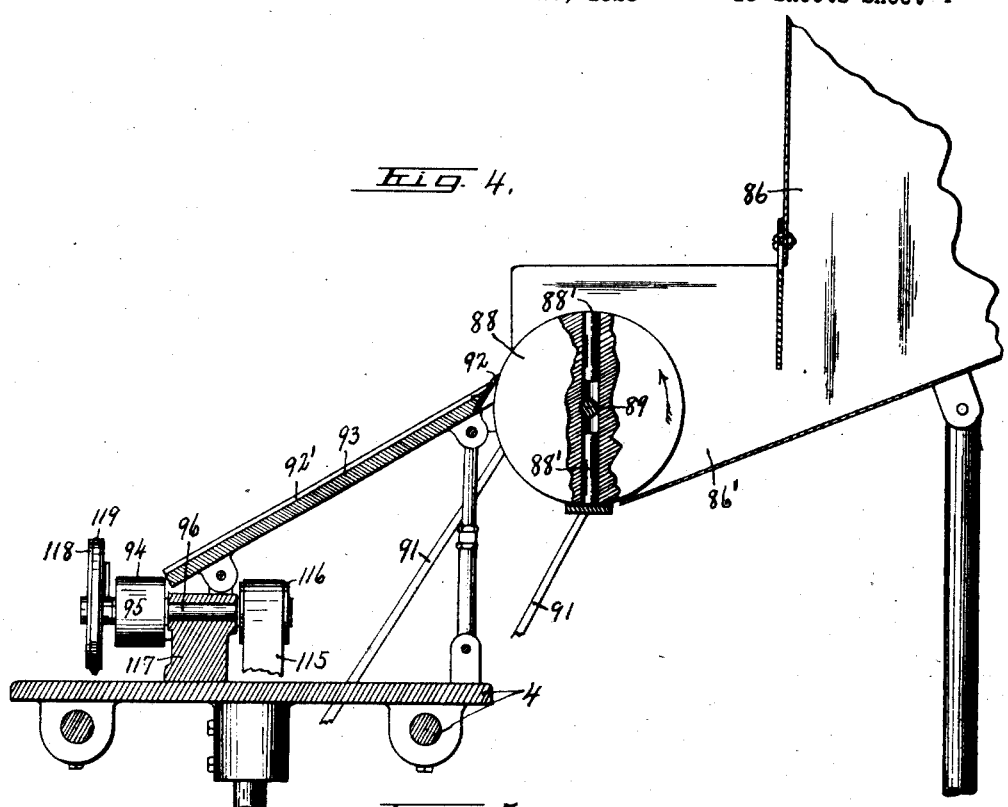
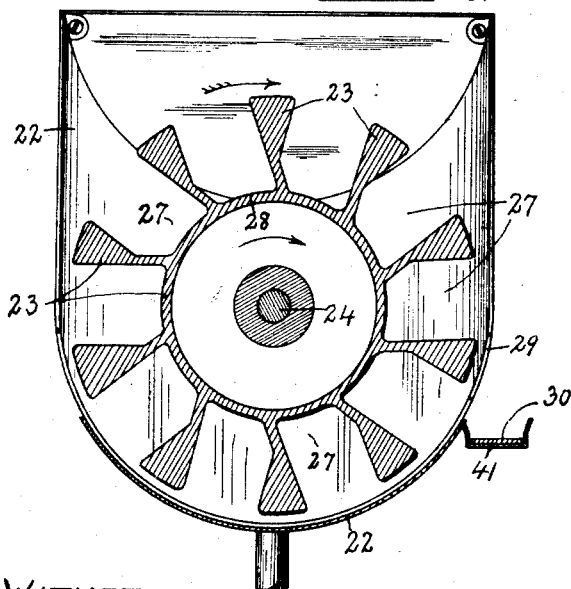

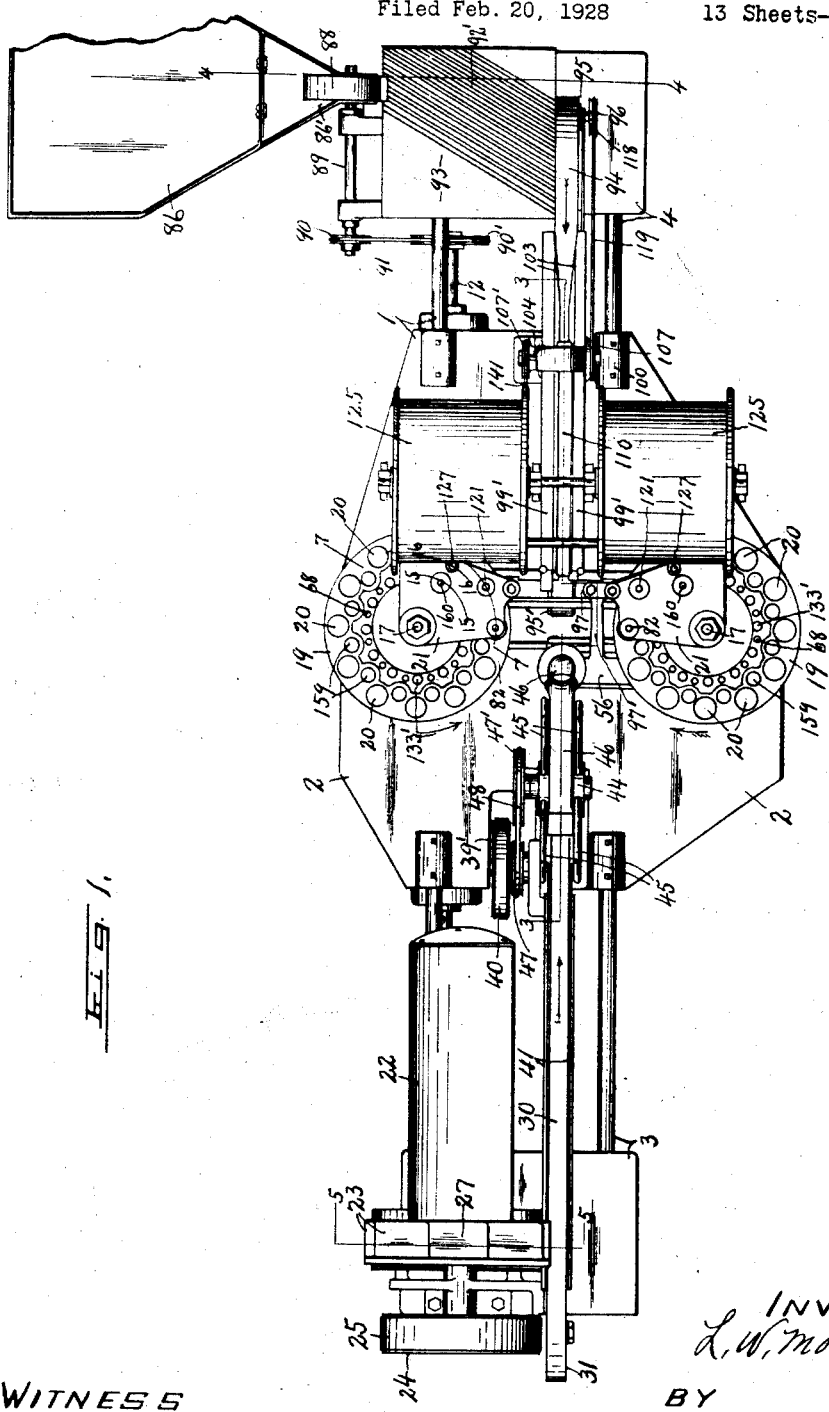

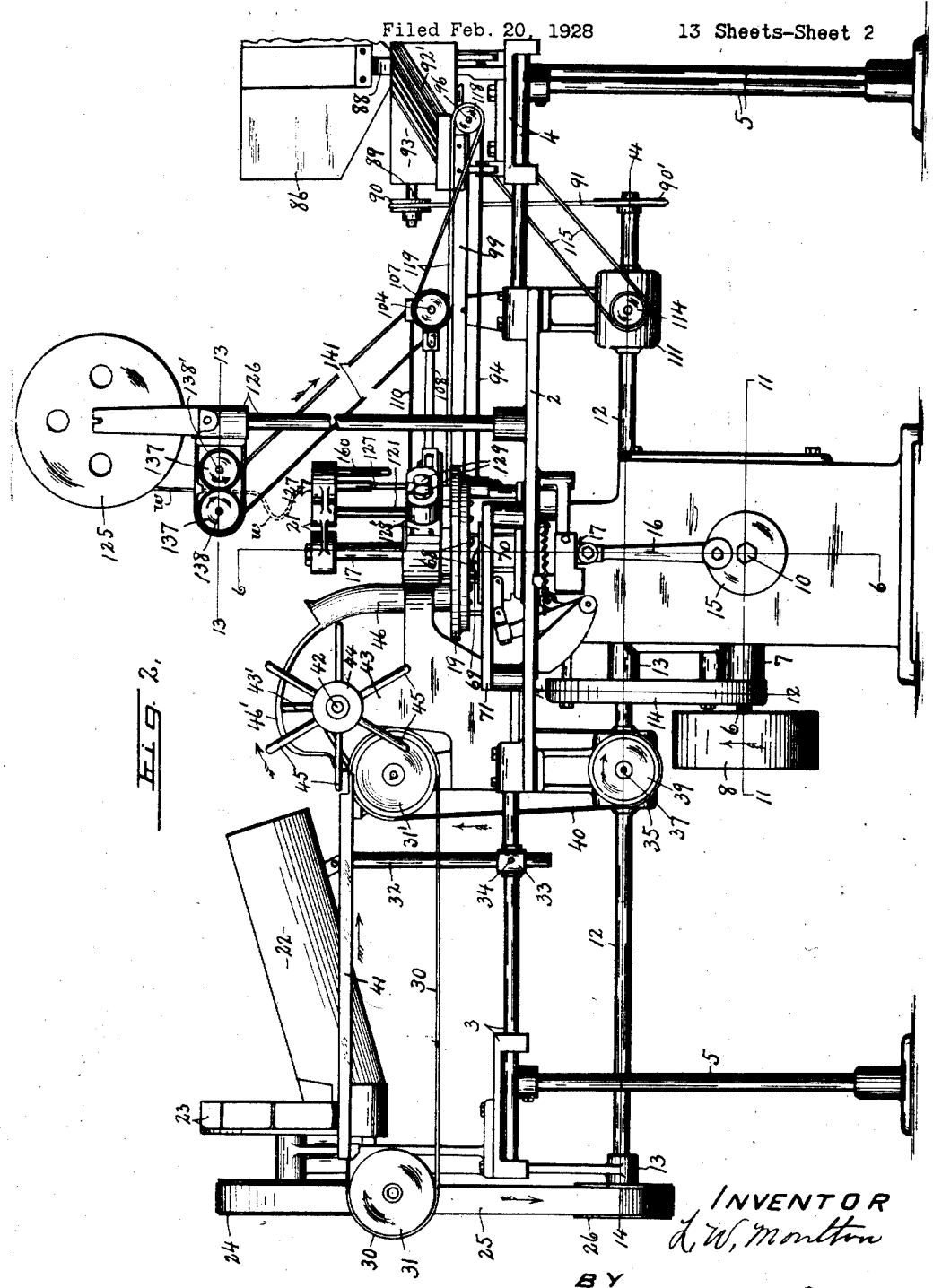

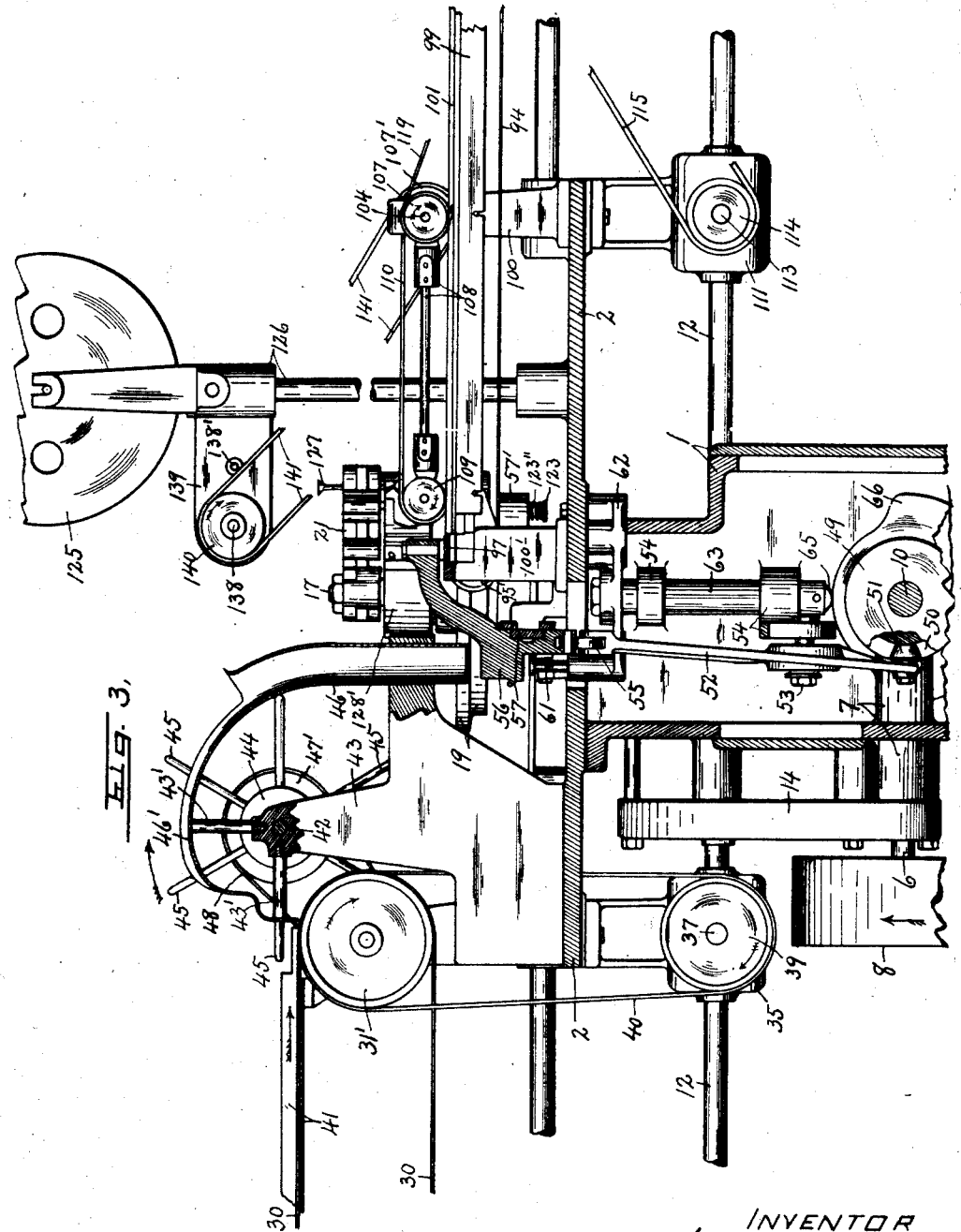

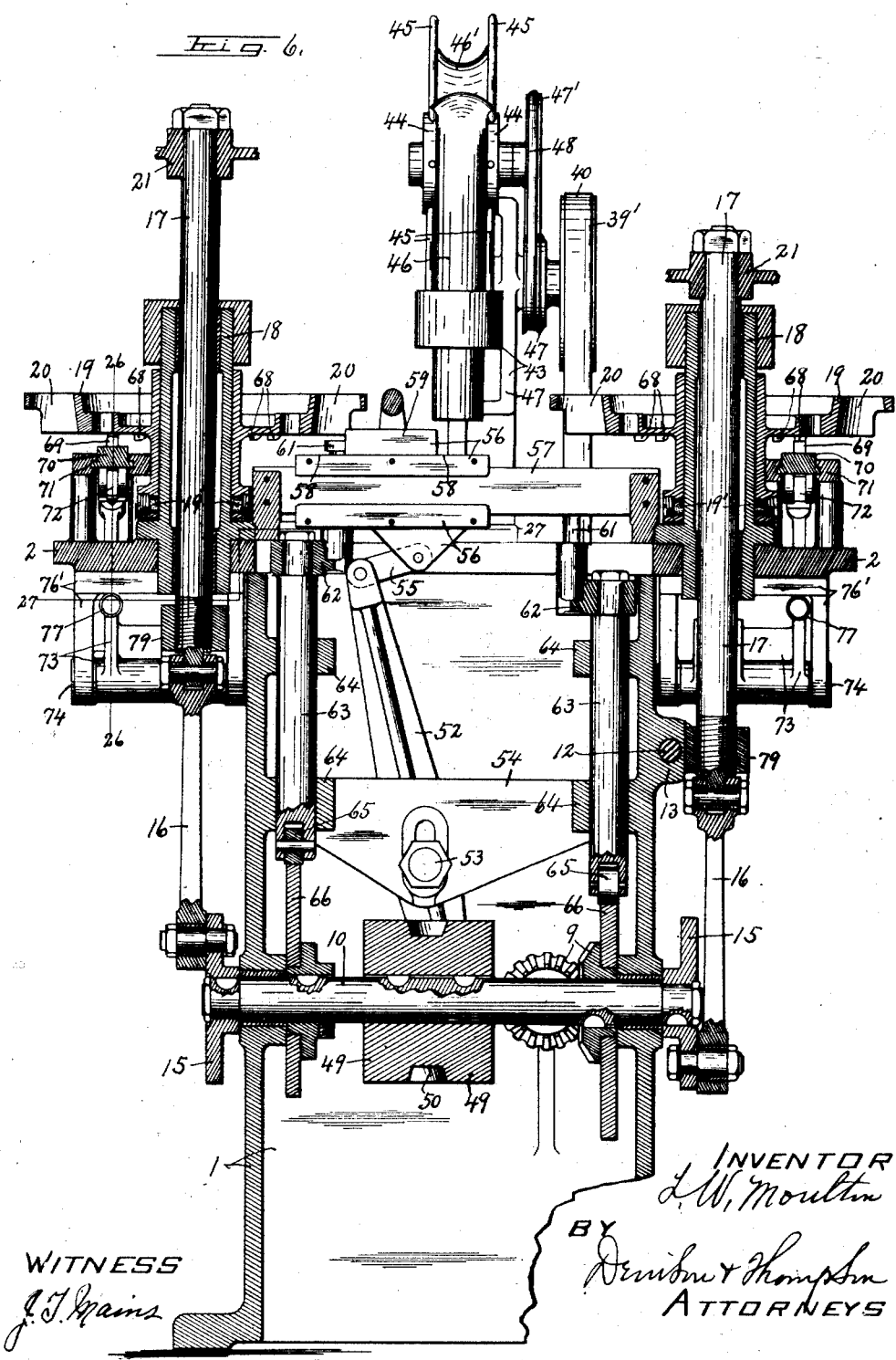

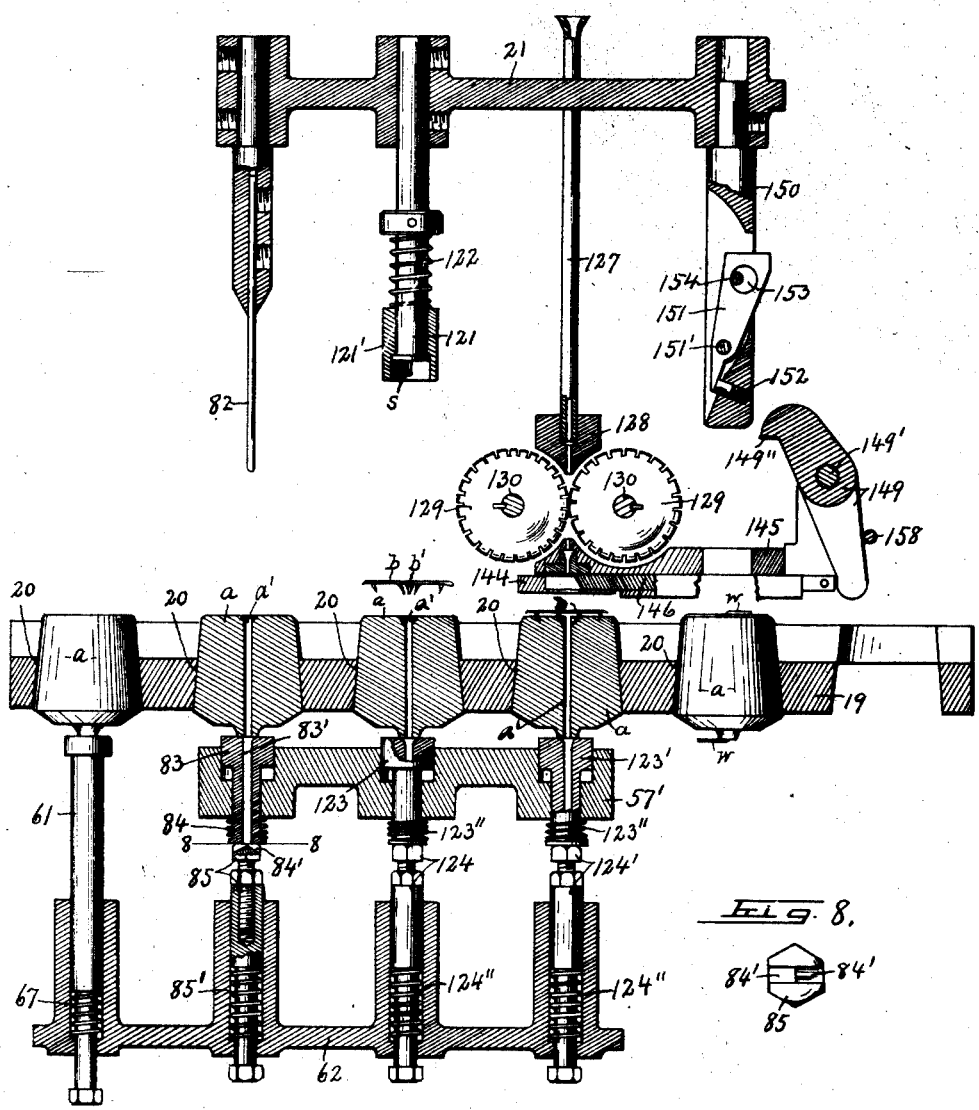

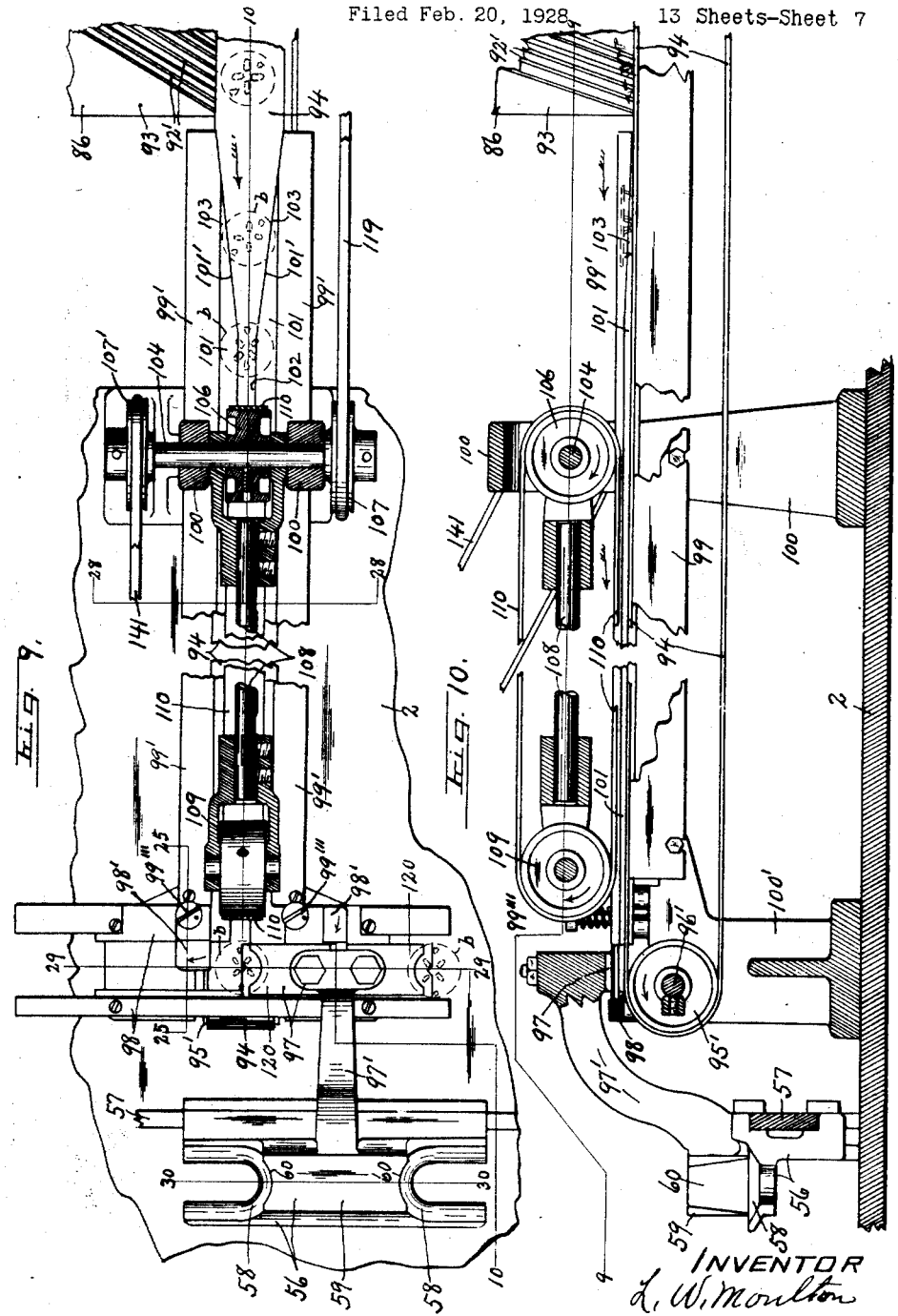

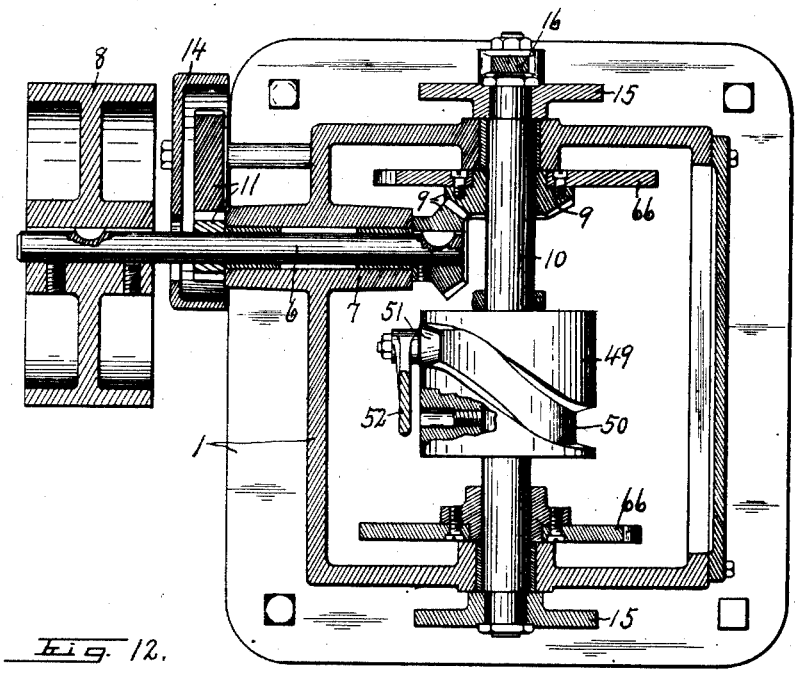
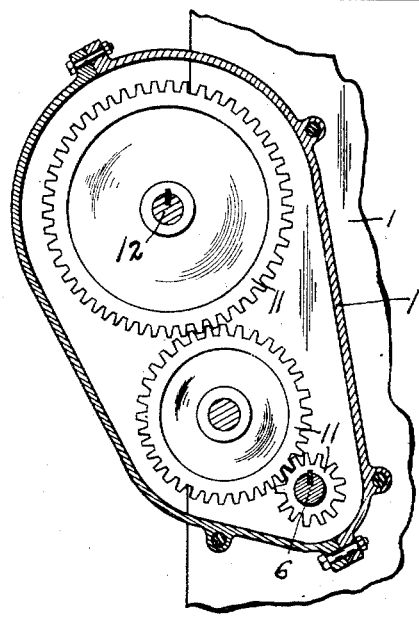
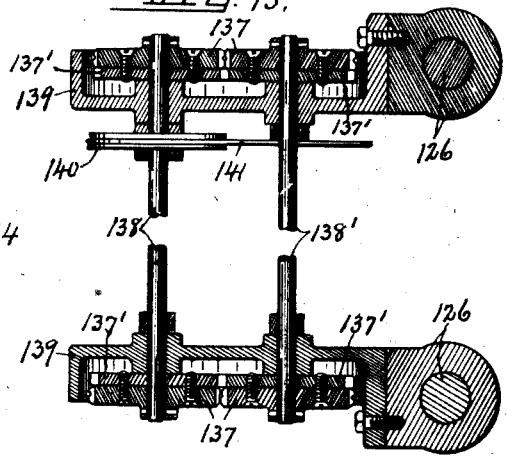

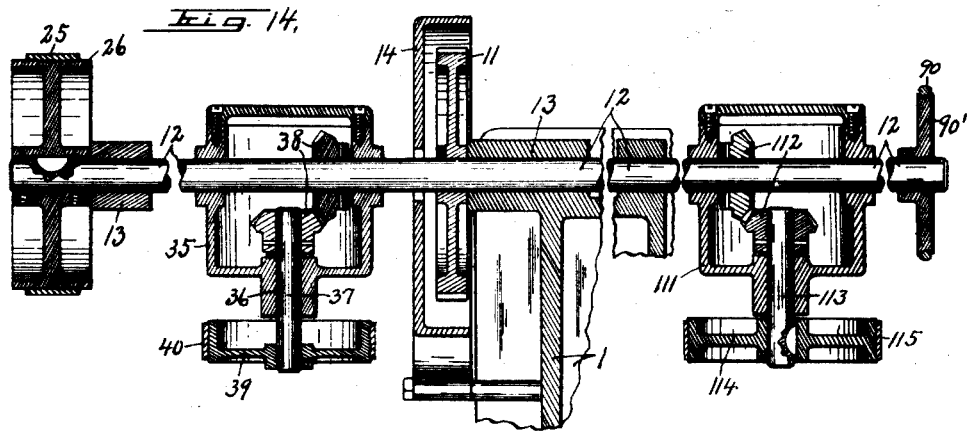
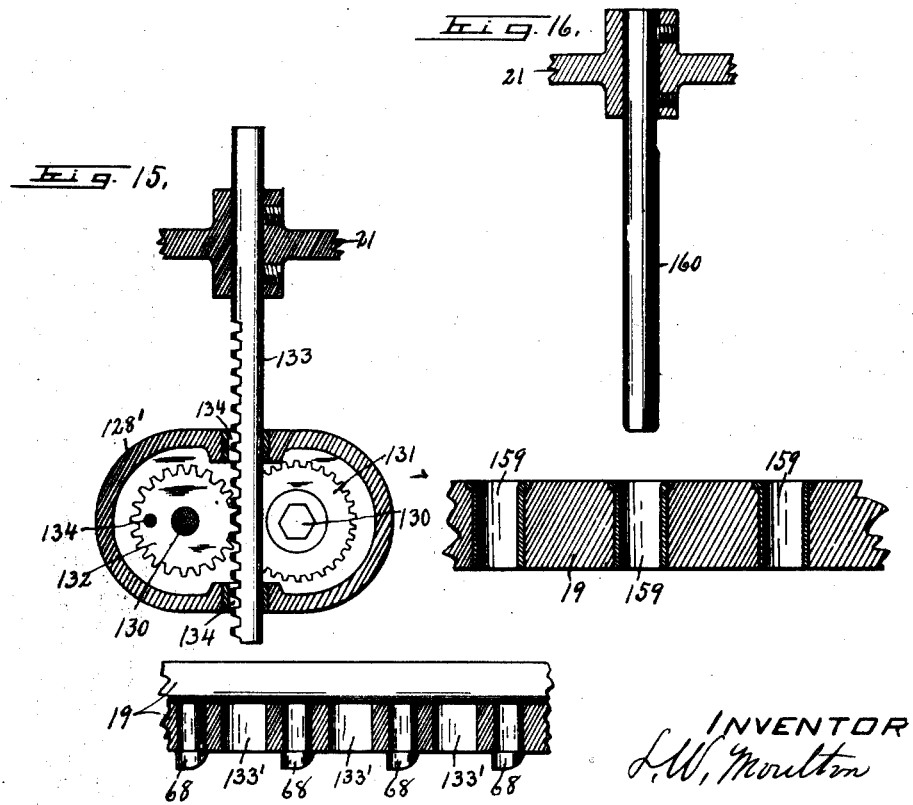

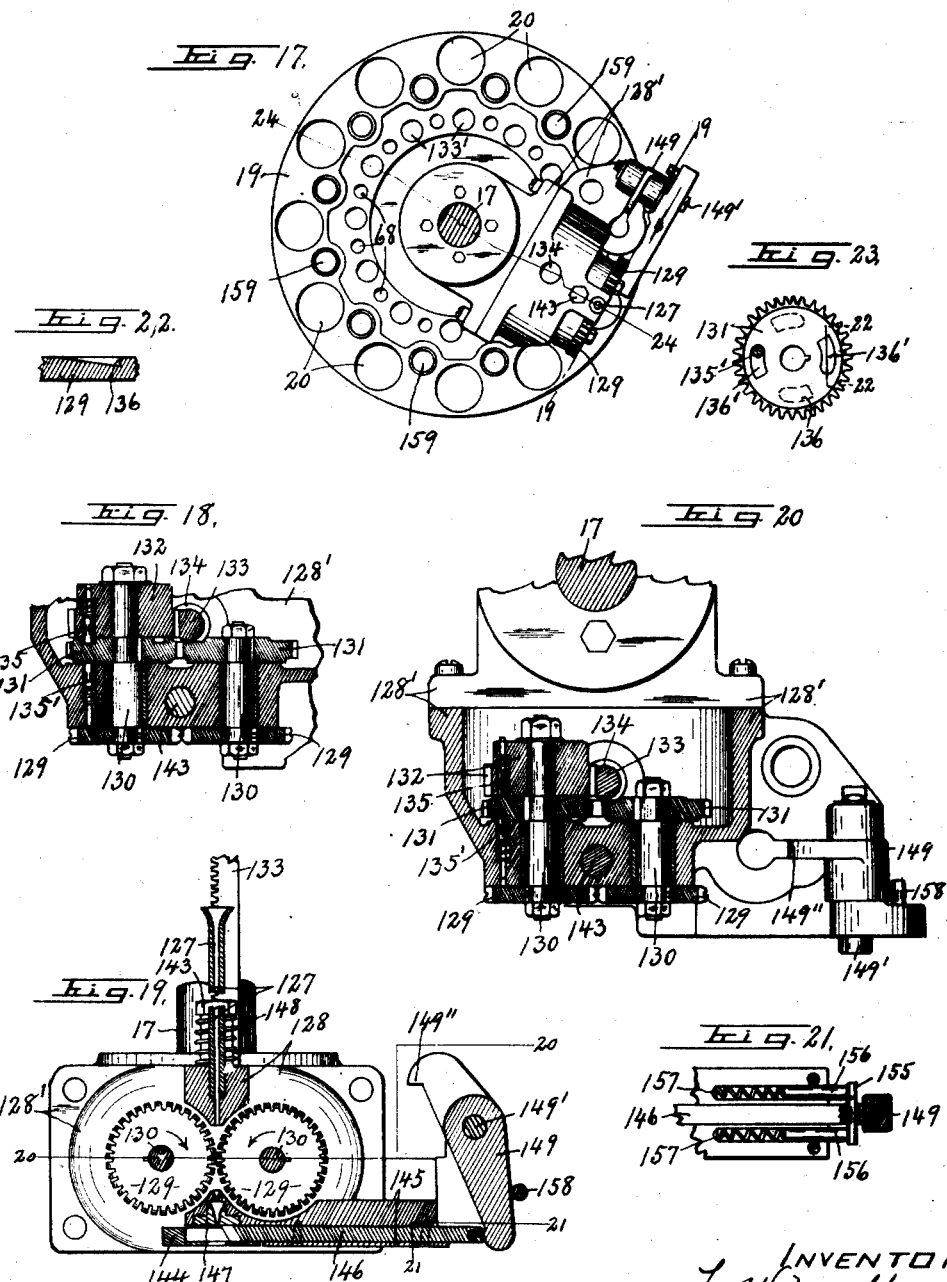

Feb. 12, 1929.  
L. W. MOULTON  
1,702,229  
CANDLE ASSEMBLING MACHINE  
Filed Feb. 20, 1928   13 Sheets-Sheet 11
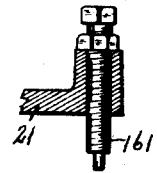
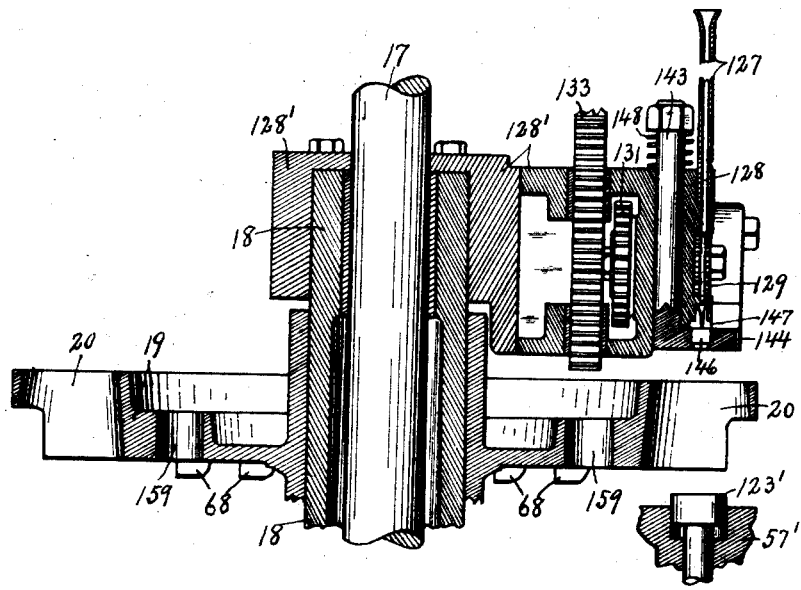
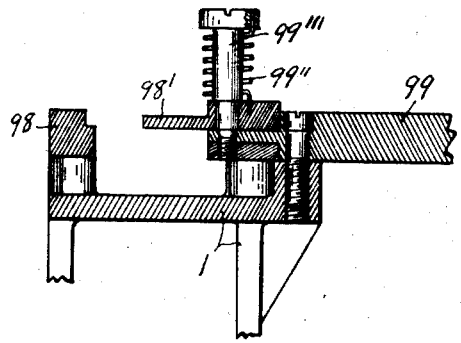
INVENTOR  
L. W. Moulton  
BY  
Denison & Thompson  
ATTORNEYS
WITNESS  
J. J. Mains Feb. 12, 1929.
L. W. MOULTON
CANDLE ASSEMBLING MACHINE
Filed Feb. 20, 1928     13 Sheets-Sheet 12
1,702,229
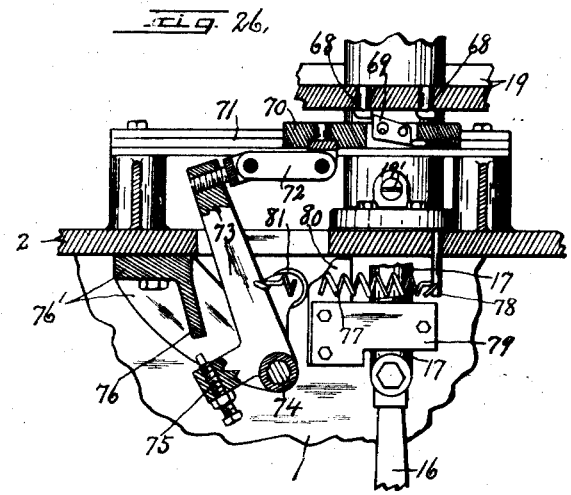
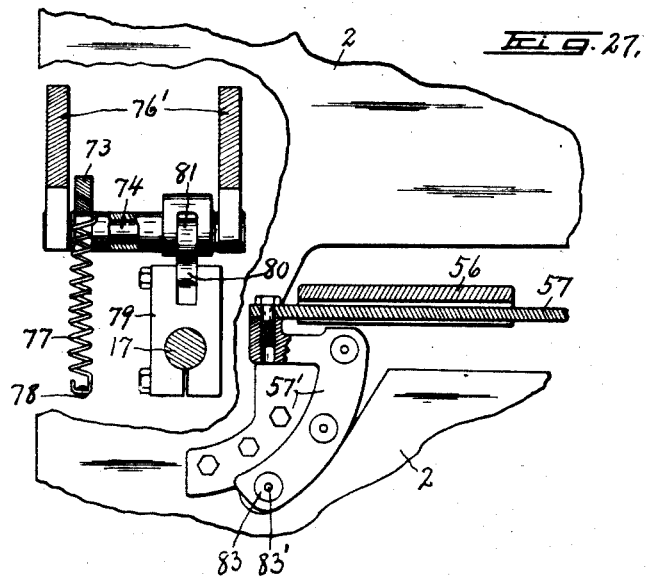
WITNESS
INVENTOR
BY
ATTORNEYS

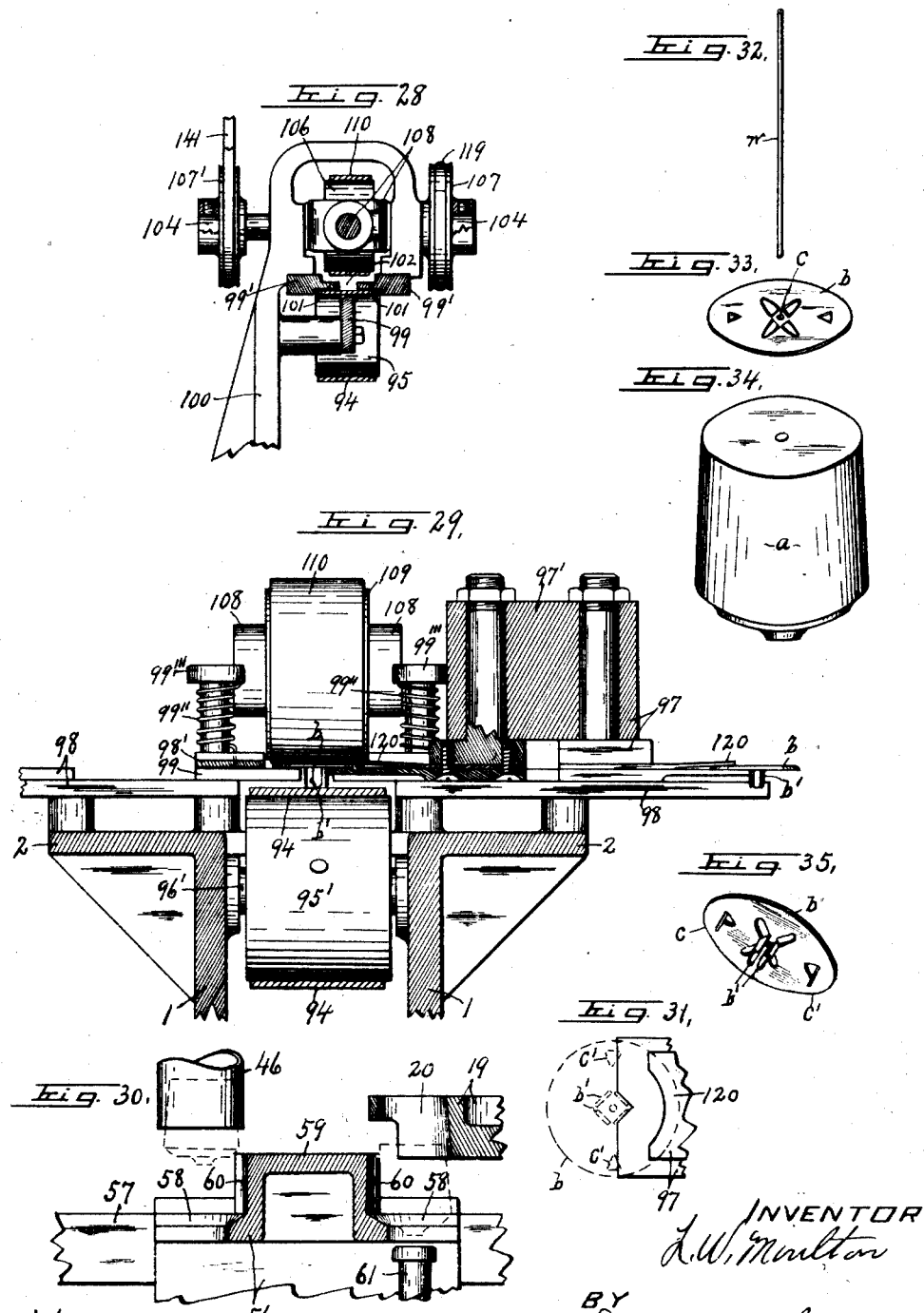

Patented Feb. 12, 1929.

1,702,229

UNITED STATES PATENT OFFICE.

LLOYD W. MOULTON, OF SYRACUSE, NEW YORK, ASSIGNOR TO WILL & BAUMER CANDLE COMPANY, INCORPORATED, OF SYRACUSE, NEW YORK, A CORPORATION OF NEW YORK.

CANDLE-ASSEMBLING MACHINE.

Application filed February 20, 1928. Serial No. 255,759.

This invention relates to a machine for assembling candles of the tapered type commonly used in sanctuaries and comprising a solid inflammable body, a metallic base and a suitable wick and the main object of the present invention is to provide a machine whereby these elements may be fed from separate sources of supply and automatically assembled in proper relation ready for use.

Another object is to enable the same machine to be used for simultaneously assembling the parts of a plurality of candles.

A further object is to provide means for automatically ejecting the completed candles from the machine as fast as the parts thereof are assembled.

Other objects and uses relating to specific parts of the machine will be brought out in the following description.

In the drawings:—

Figures 1 and 2 are respectively a top plan and a side elevation of a candle assembling machine embodying the various features of this invention.

Figure 3 is an enlarged detail vertical sectional view of the intermediate portion of the machine taken on line 3—3, Figure 1.

Figure 4 is an enlarged detail transverse vertical sectional, taken in the plane of line 4—4, Figure 1, showing more particularly the infeed mechanism for the metallic base plates or disks.

Figure 5 is an enlarged transverse vertical sectional view taken in the plane of line 5—5, Figure 1, showing the intake feed mechanism for the candle bodies.

Figure 6 is an enlarged transverse vertical sectional view through the center of the machine taken in the plane of line 6—6, Figure 2.

Figure 7 is an enlarged vertical sectional view through a circular portion of one of the rotary candle indexing carriers and superposed mechanisms for broaching the candles, applying the bases thereto, feeding the wicks through the broaches, severing the wicks and ejecting the completed candles, taken on line 7—7, Figure 1, except that the various steps are shown as developed along a straight line.

Figure 8 is a top plan of the head of one of the tappets for receiving and discharging the material expelled from the candle by the broaching operation.

Figures 9 and 10 are respectively a horizontal sectional view and a vertical sectional view of the feeding and alining mechanisms for the metal plates together with the shuttle for feeding the plates and candles to their respective indexing carriers taken on line 9—9, Figure 10, and 10—10, Figure 9.

Figure 11 is an enlarged horizontal sectional view taken in the plane of line 11—11, Figure 2.

Figure 12 is an enlarged transverse vertical sectional view taken in the plane of line 12—12, Figure 2.

Figure 13 is an enlarged horizontal sectional view taken in the plane of line 13—13, Figure 2.

Figure 14 is an enlarged horizontal sectional view, partly broken away, taken in the plane of line 14—14, Figure 2.

Figures 15 and 16 are enlarged detail sectional views, partly broken away, taken on lines 15—15 and 16—16, Figure 1.

Figure 17 is an enlarged horizontal sectional view through a portion of the machine just above one of the indexing carriers showing the latter in top plan, together with adjacent portions of the wick feeding mechanism.

Figure 18 is an enlarged horizontal sectional view of a portion of the wick feeding mechanism.

Figure 19 is a vertical sectional view of a portion of the wick feeding and cutting mechanism, taken on line 19—19, Figure 17.

Figure 20 is a horizontal sectional view taken in the plane of line 20—20, Figure 19, and is somewhat similar to Figure 18 except that the feeding pawls and holding pawls are in different positions.

Figure 21 is a detail horizontal sectional view, taken in the plane of line 21—21, Figure 19.

Figure 22 is a detail sectional view through a portion of one of the driving gears for the wick feed taken on line 22—22, Figure 23.

Figure 23 is a top plan of one of the detached driving gears for the wick feeding mechanism shown in Figures 18 and 19.

Figure 24 is an enlarged transverse vertical sectional view taken in the plane of line 24—24, Figure 17.

Figure 25 is an enlarged detail sectional view taken on line 25—25, Figure 9.

Figures 26 and 27 are enlarged detail vertical sectional views, partly broken away, taken on lines 26—26, and 27—27 respectively, Figure 6.

Figures 28, 29 and 30 are enlarged detail sectional view taken respectively on lines 28—28, 29—29 and 30—30, Figure 9.

Figure 31 is a top plan of a portion of the plate holder shown on the right hand end of Figure 29.

Figures 32, 33 and 34 are perspective views respectively of the wick, the base plate and the candle body, detached one from the other.

Figure 35 is a perspective view of the base plate showing the prongs projecting therefrom.

This machine comprises broadly a candle body feeding and positioning mechanism, a broaching device, wick-feeding and cutting mechanisms, a plate feeding and alining mechanism, means for assembling the candle body, wick and plate when brought to predetermined positions and a suitable ejector for displacing the finished candle from the machine, all of said parts being correlated and timed or synchronized in their movements to carry out the objects stated.

These various mechanisms are mounted upon a suitable supporting frame comprising, in this instance, an upright hollow base or standard —1— adapted to rest upon a floor or other support and carrying upon its upper end a horizontal shelf or table —2— having suitable out-riggings or extensions —3— and —4— projecting from opposite ends thereof and additionally supported by upright posts —5— together with other brackets and parts rigidly secured to the base —1—, table —2— or extensions —3— and —4— hereinafter more particularly described, but constituting parts of the main supporting frame.

A main driving shaft —6— is journaled in a horizontal position in a suitable bearing —7— on the upright base —1— some distance below the table —2— to extend through and beyond the side of the base and has its outer end provided with a pulley —8— adapted to be belted to any available source of power, not shown, the inner end of said driving shaft being connected by bevel gears —9— to a cross shaft —10— for transmitting motion thereto as shown in Figure 11.

The driving shaft —10— is connected by a train of speed-reducing or power increasing gears —11— to a superposed horizontal shaft —12— which is journaled in suitable bearings —13— on the standard —1— and outrigging of the main supporting frame, said gear train being inclosed in a sectional housing or gear case —14— bolted or otherwise secured to the frame standard —1—.

The cross shaft —10— is journaled in suitable bearings in the front and rear sides of the standard —1— to extend beyond the outer faces thereof and is provided on its outer ends with crank disks —15— keyed or otherwise secured thereto to rotate therewith, as shown in Figure 6.

These crank disks —15— are connected by pitmen —16— to the lower ends of vertically movable rods —17— which are guided in upright posts —18— on the table —2— at opposite sides of the longitudinal center of the machine, said pitmen having lower ends pivotally connected to the disks —15— at opposite sides of and equal distances from the axis of the shaft —10— for simultaneously moving their respective plunger rods —17— endwise in reverse directions through equal strokes for a purpose hereinafter described.

The guide posts —18— are secured at their lower ends in suitable openings in the table —2— rigid therewith and extend upwardly therefrom for receiving and supporting separate rotary carriers —19—, each having a series of, in this instance twelve, upwardly tapered circular openings —20— of uniform diameters and arranged in uniformly spaced relation circumferentially about the axes of their respective carriers for receiving the correspondingly tapered candle bodies —a—, shown in Figure 34.

The plunger rods —17— extend through and beyond the lower and upper ends of their respective guide posts —18— and are provided at their upper ends with laterally projecting offset heads —21— overhanging portions of the corresponding carriers —19—, each of said heads serving to receive and support devices for broaching the candle body, applying the base plates to said candle bodies and ejecting the finished candles from the carriers in a manner hereinafter more fully described, as the plunger rods —17— are reciprocated.

The carriers —19— and heads —21— together with the wick-feeding mechanisms are located substantially midway between the ends of the main supporting frame or machine while the candle body feeding mechanism and base plate feeding mechanism are located on opposite ends of the machine and are arranged to feed the candle bodies and base plates to both of the carriers which are intermittingly rotated one hole space at a time so that both carriers may be used simultaneously for increasing the output of the machine.

*Candle body feeding mechanism.*

The tapered candles —a— are dumped promiscuously into a hopper —22— which is supported upon the frame of the machine lengthwise thereof in a plane above and at one end of the table —2— so as to incline downwardly from its inner end toward the outer end of the machine for feeding the candles by gravity toward the lower end.

A rotary conveyor —23— is mounted upon the inner end of a horizontal rotary shaft so that its lower portion may travel within the lower end of the chute or hopper —22—, the outer end of said shaft being provided with a pulley —24— connected by a belt —25— to another pulley —26— on the outer end of the shaft —12— thereby establishing driving connection between the shaft —12— and conveyor —23—.

This conveyor is provided with a series of peripheral pockets —27— arranged in uniformly spaced relation circumferentially about its axis and closed at their inner ends by an inner annular wall —28—, Figure 5, said pockets being adapted to receive the candle-bodies from the lower end of the hopper and to convey them upwardly and circumferentially in the direction indicated by the arrow for discharging them through an outlet opening —29— in one side of the hopper below the horizontal plane of the axis thereof and upon the upper side of an endless belt conveyor —30— which extends horizontally lengthwise of the machine and is mounted upon suitable pulleys —31— and —31'—, Figure 2.

The hopper —22— is adjustable vertically to different angles as may be required to cause the candle bodies to automatically gravitate into the pockets of the rotary conveyor —23— and for this purpose the inner end of the hopper is supported upon a vertically adjustable rod —32— having its lower end movable in a socketed sleeve —33— on the main supporting frame and held in its adjusted position by a set screw —34—, Figure 2.

A gear case —35— is bolted or otherwise secured to the underside of one end of the table —2— just at the outer end of the gear case —14— and is provided in its opposite ends with openings through which the shaft —12— extends.

The front side of said gear case is provided with a transverse horizontal bearing —36— for receiving a relatively short cross shaft —37— to which rotary motion is transmitted from the shaft —12— by bevel gears —38—, the outer end of the cross shaft —37— being provided with a pulley —39— connected by a belt —40— to an overlying pulley —39'— on the shaft of the pulley —31'— for transmitting motion to the conveyor belt —30— in the direction indicated by the arrow, Figures 1 and 2.

The upper side of the belt —30— upon which the candle bodies are deposited is supported in a horizontal plane by means of a lengthwise guide —41— having upturned side flanges at opposite sides of the belt to guide the candle bodies in their longitudinal movement.

A cross shaft —42—, Figures 2 and 3, is journaled upon the upper end of a bracket —43— on the table —2— of the main supporting frame just at the rear of and in a plane slightly above the inner end of the upper side of the belt conveyor —30— and its guide —41— and is provided with suitable drums —44— at opposite sides of the bracket —43— to rotate with said cross shaft, see Figure 6.

These drums are provided with a plurality of, in this instance six, radially projecting pick-up fingers —45— arranged in uniformly spaced relation and of sufficient length to project beyond the vertical plane of the axis of the pulley —31'—, the fingers of each drum being arranged in transverse alinement with those of the other drum and preferably in spaced relation a distance slightly greater than the diameter of the smaller end of the candle —a— but less than the diameter of the larger ends of the candle bodies so that when the drums are rotated in the direction indicated by the arrow, Figure 3, each pair of transversely alined fingers of the drums will pick up the nearest candle body from the belt —30— by engaging diametrically opposite sides of the periphery of the intermediate portion thereof nearer the larger end as each pair of fingers move upwardly across the rear end of the candle guide —41— at opposite sides of the adjacent portion of the belt.

As each pair of the fingers —45— picks up one of the candles in the manner just described and carries it upwardly in the direction indicated by the arrow the mass of weight of the candle body will be below the points of engagement of the fingers, with said body thereby allowing the candle to assume an upright position with its larger end at the top immediately upon its removal from the inner end of the guide —41—.

The width of the belt —30— and guide —41— is slightly less than the distance between the fingers —45— of each pair to allow the outer ends of said fingers to pass the outer sides of the guide and belt and also across the outer end faces of the adjacent portion of the pulley —31'— to assure engagement of the fingers of each pair with the peripheries of the larger end of said candle bodies for conveying the latter upwardly and inwardly toward the carriers —19— in the direction indicated by the arrow as they are successively presented to the outer ends of the fingers by the upper side of the conveyor belt.

Suitable means is provided for inverting the candle bodies and conducting them in their inverted positions to a transversely movable shuttle, presently described, and for this purpose a receiving tube —46— is secured in an opening in the bracket —43— at the inner side of the drums —44— to extend upwardly and longitudinally around the upper sides of the drums and thence downwardly to the outer sides thereof so as to terminate near the rear end of the guide —41—, the extension as —46'— of said receiving tube being disposed in a vertical plane between the opposite sets of fingers —45— and some distance within the outer ends thereof, the distance between the axis of the drums —44— and extension —46'— gradually increasing inwardly as it approaches the tube —46— which is disposed in a more or less vertical plane beyond the path of movement of the outer ends of the fingers as shown in Figure 3.

It is now evident that when the individual candle bodies are picked up from the inner end of the belt —30— and guide —41— by the upwardly moving fingers —45— the smaller ends will trail along and against the extension —46'— which, by reason of its curvature and the motion of the transverse fingers in the direction indicated by the arrow, will cause the candles to be drawn into the upper end of the tube —46— with their larger ends foremost or heading downwardly in which position they are deposited by said tube onto the underlying shuttle, hereinafter more fully described.

The pulleys —31— and —31'— are mounted on suitable shafts on the main supporting frame, the shaft for the pulley —31'— being extended rearwardly some distance beyond the guide —41— and is provided with an additional pulley —47— connected by a belt —48— to a companion pulley —47'— on the rear end of the shaft —42— for transmitting rotary motion to the pick-up drums —44—.

In addition to supporting the tube —46— on the bracket —43— the extension —46'— may be held in operative position by radial posts —43'— on the standard —43—, as shown in Figure 3.

It will be observed upon reference to Figure 6 that the delivery tube or chute —46— for the candle bodies is located in a vertical plane midway between the carriers —19— and, it, therefore, becomes necessary to provide some means for alternately transferring the candle bodies delivered from the tube —46— to the carriers —19— and for this purpose the cross shaft —10— is provided with a cam wheel —49— having a peripheral cam groove —50— adapted to be engaged by a roller —51— on the lower end of an upwardly projecting lever —52—, Figure 3.

This lever —52— is pivotally fulcrumed at —53— on a cross bar —54— within the frame standard —1— and has its upper end connected by a link —55— to a sliding cross head or shuttle —56— which, in turn, is mounted upon a cross bar —57— on the upper portion of the upright frame standard —1— just above the table —2—, which latter is provided with a central opening for receiving the connection between the lever —52— and cross head —56—, as shown more clearly in Figure 6.

As previously stated, the delivery tube —46— is located substantially midway between adjacent sides of the carriers —19— which, in turn, are arranged and operated so that two of the candle body sockets —20— on said adjacent sides will be disposed in about the same transverse vertical plane as the delivery tube, said carriers being also disposed in approximately the horizontal plane of the lower end of the delivery tube.

The shuttle —56— is movable in a transverse vertical plane passing through the axis of the tube —46— and openings —20— in adjacent sides of the carriers —19— for alternately transferring the candle bodies delivered from said tube to the transversely alined openings —20— in said carriers to be immediately forced from the bottom upwardly into the registering openings in a manner hereinafter described.

The cam —50— and lever —52— are arranged to move the shuttle —56— across and to opposite sides of the axis of the tube —46— a distance substantially equal to the distance between said axis and the axis of the adjacent openings —20— in the carriers so that when moved in one direction it will feed the candle body from the tube into the registering opening —20— of one of the carriers and when moved in the opposite direction will feed the next succeeding candle body into the opening —20— of the opposite carriers.

In order to accomplish this last-named result the shuttle —56— is provided with opposite horizontal platforms —58— adapted to alternately register with the lower end of the tube —46— as the shuttle is reciprocated for receiving and temporarily supporting the candle bodies as they are depressed from said tube.

The shuttle is provided with a central upwardly projecting push block —59— extending above and between the platforms —58— for pushing the candle bodies resting on said platforms into registration with the openings —20— of the corresponding carriers —19—, the opposite ends of the push block —59— being provided with concaved recesses —60— for receiving the adjacent portions of the periphery of the candle bodies and centering them on the platforms —58— preparatory to registering them with the corresponding openings —20— in the carriers.

When the shuttle is shifted to register the candle bodies carried thereby with the openings —20— in the carriers —19— the registering candles are forced upwardly into the openings by plungers —61— which are yieldingly mounted and guided upon separate supporting plates —62—, one for each carrier, said plates being mounted upon the upper ends of vertically movable plungers —63—, see Figures 3, 6 and 30.

These plungers are guided in suitable bearings —64— on the inner sides of the standard —1— and have their lower ends provided with rollers —65— engaged with the perimeters of rotary cams —66— which are secured to the shaft —10— at opposite ends of the cam wheel —49— to rotate with said shaft, see Figure 6.

The high points of the cams —66— are arranged at diametrically opposite sides of the axis of the shaft —10— corresponding to the offset relation of the connections between the pitmen —16— and their crank disks —15— so that when the plungers —17— corresponding to one of the carriers is in its lowermost position the adjacent plunger —63— and parts carried thereby will also be in their lowermost position and vice versa for a purpose hereinafter more fully described, see Figures 3 and 6.

That is, when the candle body is shifted by the shuttle —56— from the delivery tube —46— into registration with an opening —20— in the carrier —19— the plunger —63— carrying the plunger —61— of the corresponding carrier will be elevated to force the candle body into said opening, both of which are tapered upwardly to enable the candle body to be frictionally held in the opening while the carrier —19— is being shifted rotarily one hole space at a time for further operations, presently described.

The lower ends of the plungers —61— normally rest upon coiled springs —67— in the guide openings in the plates —62— as shown in Figure 7 to enable the candle bodies to be forced into their respective openings —20— under yielding pressure and thereby to avoid mutilation of the candle bodies by the walls of the opening and at the same time to assure a friction fit of the candles in the openings.

*Carrier rotating mechanisms.*

The carriers —19— are rotated intermittingly and alternately one hole space at a time to successively bring their holes into registration with the underlying plungers —61— and for this purpose each carrier —19— is provided on its underside with a number of ratchet teeth —68— corresponding to the number of openings —20— and arranged in uniformly spaced relation circumferentially to be successively engaged by a pawl —69— on a sliding plate —70— which is reciprocally movable along a horizontal guide —71—, Figure 26, and is adapted to be operated in one direction for rotating the corresponding carrier at each upward movement of the adjacent plunger —17—.

Each of the sliding plates —70— is connected by a link —72— to one arm of the bell crank lever —73— which is pivotally fulcrumed at —74— on the frame —1— and has its other arm provided with an adjustable stop screw —75— adapted to engage a fixed stop —76— on the underside of the table —2— for limiting the movement of the bell-crank arm and pawl plate —70— in the other direction as produced by a retracting spring —77—, said spring having one end connected to the lever —73— and its other end connected to a post —78— on the underside of the table —2—, as shown in Figure 26.

Each of the plungers —17— is provided near its lower end with a head —79— having a cam member —80—, Figure 26, adapted to engage a roller —81— on the lever —73— as the plunger approaches the limit of its upward movement for rocking said lever against the action of its retracting spring —77— and thereby effecting a corresponding sliding movement of the pawl plate —70— for rotating the carrier —19— one tooth space at a time and thereby successively registering the openings —20— with the underlying plunger —61—, as shown at the lower left hand side of Figure 7.

The shifting mechanisms for both carriers are identical and, therefore, the description just applied to one of said mechanisms also applies to the other. The opposite ends of the guide bar —57— for the shuttle —56— are bolted or otherwise secured to brackets —57'— which, in turn, are bolted or otherwise secured to the table —2— to form a part of the main supporting frame and also to form tappet guides, hereinafter described, one for each carrier —19—, Figure 27.

The bearings —74— for the levers —73— are mounted upon brackets —76'— which are bolted or otherwise secured to the underside of the table —2— to form a part of the main supporting frame, as shown more clearly in Figures 6 and 26.

As previously stated, the plungers —17— are simultaneously moved in reverse directions and, therefore, when one is moving upwardly to effect the angular movement of its carrier —19— the other plunger will be moving downwardly and in order to prevent accidental angular movement of the carriers the lower end of the hub of each carrier is provided with brake members —19'— adapted to frictionally engage the adjacent portion of the periphery of the corresponding post —18—.

The cam —66— and crank disk —15— for each carrier are so timed with relation to the cam —50— of the cam wheel —49— that the shuttle —56— will be operated to transfer a candle body from the chute —46— into alinement with the adjacent opening —20— of one of the carriers —19— just before the corresponding plunger —61— begins to rise and this rising of the plunger to force the candle into the registering opening —20— occurs just before the shifting of the pawl plate —70— from its normal position to index the carrer with the candle therein one toothed space in the direction indicated by the arrow, Figure 1.

The reciprocal motion of the shuttle —56— by the cam —50— is gradual but the vertical operation of the plungers —61— by their respective cams —66— is rather abrupt with a relatively long dwell between the shifts.

It will also be noted that the angular shifting of each carrier —19— is also abrupt and takes place only as the plungers —17— approach the limit of their upward movements for quickly advancing the candle to the next position for broaching, in a manner presently described.

Broaching means.

The candles are preformed before being placed into the hopper —22—, except that no provision is made for receiving the wicks, and for this purpose is provided a broaching tool —82— mounted upon the head —21— so that when the latter is drawn downwardly by the downward movement of its supporting plunger —17— it will be forced through the central portion of the underlying candle body in the carrier —19—, as shown in Figure 7.

That is, when the candle is forced into a registering opening —20— in the carrier —19— by the upward movement of the head —62— and its plunger —61— the carrier is then shifted one toothed space to bring the loaded candle body into vertical alinement with the broaching tool —82— and directly over the upper side of the stationary bracket —57'— having a candle rest —83— yieldingly supported therein for engaging and holding the candle in its opening —20— in the carrier —19— against downward displacement during the broaching operation.

This candle rest —83— is yieldingly held in its lowermost position by a coiled spring —84—, Figure 7, and is adapted to be raised slightly from its normal position by the upward movement of the head —62— through the medium of a tappet —85— which is yieldingly mounted on the head —62— by means of a coiled spring —85'— so that as the head —62— is raised to cause its plunger —61— to force the adjacent candle into the registering opening —20— in the carrier —19— the tappet —85— will simultaneously engage and force the rest —83— into engagement with the previously loaded candle in the next preceding opening.

The rest —83— is provided with a central vertical opening —83'— for receiving the broaching tool —82— and permitting the material displaced from the candle body by said tool to be expelled through and from the lower end of the rest —83—, the upper ends of the tappet —85— being beveled in opposite directions at —84'— to facilitate the expulsion of the waste candle material, as shown in Figures 7 and 8.

Although I have shown and described only one of the broaching tools —82— it is to be understood that a similar tool is used in connection with both of the carriers —19— as the unbroached candle bodies are successively loaded therein.

Base plate feeding mechanism.

After the candle body has been broached in the manner just described the carrier —19— is again shifted one tooth space to bring the broached candle body to another position for receiving a metallic base plate as —b—, shown more clearly in Figures 7, 33 and 35.

These metallic base plates or disks are dumped promiscuously into a suitable hopper —86— which is mounted upon the main supporting frame at the end thereof opposite that upon which the hopper —22— is mounted and is provided with an outlet —86'— in which is mounted a rotary magnet wheel —88— carrying a plurality of, in this instance two, diametrically opposite permanent magnets —88'— having their outer ends substantially flush with the periphery of the wheel —88—.

This magnet wheel is mounted upon a horizontal longitudinally extending shaft —89— having its outer end provided with a pulley —90— connected by a belt —91— to an additional pulley —90'— on the adjacent end of the shaft —12,— Figure 2, for transmitting rotary motion to the magnet wheel —88— in the direction indicated by the arrow, Figure 4.

The bottom of the hopper —86— is inclined downwardly and inwardly and terminates at its lower end adjacent the underside of the magnet wheel —88— for automatically feeding the disks by gravity to said magnet wheel. These disks are preferably made of tin and are drawn flatwise against the periphery of the wheel —88— by the outer ends of the magnets —88'— so as to be rotated upwardly and inwardly from the inclined bottom —86'— in the direction indicated by the arrow and as they approach the inner side of the wheel they are removed by a stripper blade —92— on the upper end of an inwardly and downwardly inclined plate —93—, Figure 4.

This plate is inclined not only inwardly and downwardly, but laterally and downwardly and is provided, in its upper face, with a series of lengthwise grooves —92'— to facilitate the downward travel of the disks, particulary when the prongs of the disks are adjacent the surface of the plate —93—.

On the other hand, if the smooth or plain surfaces of the disks lie adjacent the inclined surface of the plate —93— they will slide downwardly and laterally from the plate to be replaced in the hopper.

The plate —93— is supported upon the main supporting frame or table —2— with the lower end of its upper face terminating adjacent a horizontal longitudinally movable conveyor belt —94— which is mounted on longitudinally spaced pulleys —95— and —95'—, the latter being secured to rotary shafts —96— and —96'—.

This belt —94— extends from the lower end of the chute —92'— to and beneath a secondary shuttle —97— in the same vertical plane as the conveyor belt —30— for the candle bodies and has its upper side disposed in a horizontal plane slightly above the upper faces of the carriers —19— and midway between the adjacent sides thereof, as shown in Figure 2, so that when moved in the direction indicated by the arrow, Figure 9, the disks —b— will be carried inwardly from the lower end of the chute —93— to the supplemental shuttle —97— with their prongs facing downwardly.

That is, each disk —b— is provided with a central wick opening —c— and a series of, in this instance four, prongs —b'— arranged in uniformly spaced relation about the central opening —c— and converging toward each other at one side of the disk, said disk being also provided with diametrically opposite prongs —c'— projecting from the same side of the disk as the prongs —b'— and together with said prongs —b'— are adapted to be pressed into the small end of the candle in a manner hereinafter described when registered with the candle in one or the other of the carriers —19—.

The supplemental shuttle —97— is rigidly connected to the primary shuttle —56— by an arm —97'— so that both shuttles may move in unison transversely of the machine, the secondary shuttle —97— being movable along transverse guideways —98— parallel with the guide bar —57— as shown in Figure 9.

The upper side of the belt —94— is movable along the upper face of a longitudinally extending bed plate —99—, which together with the guides —98—, are mounted upon brackets —100— and —100'— on the main supporting frame or table —2— for supporting that part of the belt against sagging.

Guide bars —99'— are provided with opposite lengthwise flanges —101— projecting inwardly toward each other from their opposite longitudinal edges so as to overhang the adjacent edges of the upper portion of the belt —94— but having their inner edges in transversely spaced relation so as to permit the passage of the prongs of the disks through the intervening slot as —102—.

The ends of the flanges —101— adjacent the lower end of the guide chute —93— converge inwardly at —101'— and are also beveled longitudinally at — 103— so that their ends adjacent the guide chute —93— are relatively thin and sharp to enable the disks to ride easily thereon when carried toward the center of the machine by the upper side of the belt —94—.

That is, when the disks ride down the longitudinally groove chute —93— with their prongs at the underside they are deposited upon the adjacent portion of the belt —94— with the prongs in engagement therewith and, therefore, the flat bodies of the disks are slightly elevated above said belt so that when they are carried inwardly the flat portions of the disks will ride upon the inclined surfaces —103— of the flanges —101— and thence along the upper faces of said flanges with the prongs still in engagement with the belt to allow the latter to feed them inwardly along and between the guide flanges.

The object of the inwardly converging edges as —101'— of the flanges —101— is to engage and aline the prongs —c'— of the disks lengthwise of the machine within the slot —102— thus bringing all of the disks into similar positions as they are successively fed from the chute —93— upon the upper portion of the belt —94— to the shuttle —97—.

A cross shaft —104— is journaled in transversely spaced bearings on the bracket —100—, Figure 9, to extend to opposite sides of the longitudinal belt —94— and is provided with a central pulley —106— and opposite end pulleys —107— and —107'—, the central pulley —106— being disposed directly over the longitudinal center of the belt —94—.

An arm —108— is pivotally mounted at one end upon the shaft —104— to swing vertically and to extend inwardly therefrom along the upper side of the belt —94— and upon its inner end is journaled a pulley —109— in lengthwise alinement with the pulley —106—, said pulleys being adapted to receive and support an endless belt —110— to move vertically therewith and to rotate with the shaft —104—.

The lower side of the belt —110— is movable lengthwise of the machine in the direction of and in close proximity to the upper side of the belt —94— but in a plane just above the upper faces of the guide flanges —101— for engaging the upper flat sides of the disks and assisting the lower belt in feeding the disks from the receiving end of the belt —94— into the path of movement of the secondary shuttle —97—, the inner end of the supporting arm —108— for the belt —110— being free to move downwardly by its own weight to cause said belt to contact with the disks as they are fed along and upon the belt —94— to assure positive feed of said disks into the path of the secondary shuttle.

A gear case —111— similar to the gear case —35— is bolted or otherwise secured to the underside of the table —2— and is provided in its opposite ends with bearings for receiving the shaft —12— which is connected by gears —112— to a cross shaft —113—, the latter being journaled in the front side of the gear case —111— and provided with a pulley —114—.

This pulley is connected by a belt —115— to a pulley —116— on the cross shaft —96—, Figures 2 and 4. This shaft —96— is journaled in a bracket —117— on the table —2— and in addition to the belt pulley —95— is provided with a pulley —118— which is connected by a cross belt —119— to the pulley —107— on the cross shaft —104—, Figure 2, for driving the upper supplemental feed belt —110—.

The shuttle —97— Figure 9 is reciprocally movable across and to opposite sides of the longitudinal centers of the belts —94— and —110— for transferring the disks to each of the carriers —19— for applying the same to the upper small ends of the candle bodies as the latter are successively presented to the next position following the broaching operation, previously described.

That is, as the individual disks leave the inner end of the upper belt —110— they are carried forwardly on to the adjacent end of the shuttle —97— and partially beneath a leaf spring —120—, Figures 29 and 31, on said shuttle which is adapted to engage the adjacent edge of the disk to cooperate with the underlying portion of the shuttle for holding the disk in operative position on the shuttle as it is shifted thereby to a position directly over the upper end of the candle body in the carrier —19— preparatory to applying the same to said candle body, as shown in Figure 7, it being understood that both ends of the shuttle —97— are equipped with similar leaf springs —120— for transferring the disks —b— first to one and then to the other of the carriers —19— as the shuttle is reciprocated in reverse directions simultaneously with the shifting of the shuttle —59—.

Referring to Figure 7, it will be noted that the first candle body at the left has just been forced into one of the openings —20— in the carrier —19— and immediately following this operation the carrier is shifted rotarily one tooth space about its axis to bring the candle into the second position in alinement with the broaching tool —82— which is then operated to broach the wick opening through the center thereof. The carrier —19— is then rotated one tooth space to bring the broached candle into position for receiving the disk —b— on its upper end through the operation of the shuttle —97—, Fig. 29.

When the disk —b— is thus alined with the upper end of the candle body it is forced into engagement therewith by a vertically movable plunger —121— mounted on the head —21— to move therewith and provided with a pilot —s—.

The lower end of the plunger is provided with a relatively movable disk-engaging member —121'— which is yieldingly held in its lowermost position by a coiled spring —122— but is free to yield against the action of said spring by pressure against the disk —b— as the plunger is moved downwardly for applying the disk to the upper end face of the underlying candle body —a—, see Figure 7.

When the disk is applied to the upper end of the underlying candle body the carrier —19— will be again shifted one tooth space to bring the candle with the disk thereon into alinement with the wick guide and feeding mechanism, presently described, but indicated directly over the fourth candle from the left in Figure 7, it being understood that the disk-applying plunger —121— is movable simultaneously with the broaching tool —82— so that when one candle body is being broached the disk is being applied to the next adjacent candle body, this operation being repeated at each shifting movement of the carrier —19—.

During the operation of applying the disks to the candles the latter will be held in operative position by a rest —123— similar to the rest —83— and adapted to be operated by a yielding tappet —124— similar to the tappet —85—, the candle rest —123— being mounted upon a stationary head —57'— while the tappet —124— is mounted upon the vertically reciprocating plate —62— carried on the upper end of the corresponding plunger —63—, as previously described.

*Wick feeding and guiding mechanism.*

The wicking from which the wicks as —w— are to be cut is wound upon a reel —125— which, in turn, is rotatably mounted upon a supporting standard —126— on the main supporting frame in a plane some distance above the carriers to allow the wicking to be fed downwardly therefrom and through a vertical guide tube —127— having its lower end terminating in a guide block —128— closely adjacent the upper sides of the meeting faces of a pair of feed rolls —129— which are mounted on supporting shafts —130— for rotary movement in the direction indicated by the arrows, see Figures 7 and 19.

The terminal block —128— and guide tube —127— is held in a fixed position upon the main suporting frame in vertical alinement with the axis of one of the candle bodies —a— in the carrier —19— after the latter has been shifted one toothed space immediately succeeding the application of the disk —b— thereto.

That is, the terminal block —128— forms a part of a bracket —128'— which is bolted or otherwise secured to the frame of the machine, as shown more clearly in Figures 2, 19 and 20.

The shafts —130— are journaled in suitable bearings in the bracket —128'— and are provided with intermeshing gears —131— for simultaneously rotating the disks —129— in the direction indicated by the arrows in Figure 7, one of said shafts being provided with an additional gear —132— loose thereon and engaged with a vertically movable toothed rack —133— which, in turn, is reciprocally movable in a guide opening —134— in said bracket —128—, as shown more clearly in Figures 15 and 20.

The upper end of the rack —133— is adjustably secured by set screws or other fastening means to the vertically movable head —21— to move therewith for transmitting rotary motion to the gear —132—. This gear —132— is provided with a pawl —135— adapted to engage ratchet teeth —136— on the adjacent face of the coaxial gear —131— for rotating the latter and thereby effecting the rotation of the wick feeding wheels —129— as the rack —133— is moved in one direction, in this instance downwardly.

A holding pawl or detent —135′— Figure 20 is mounted in a suitable opening in the bracket —128— to engage teeth —136′— Figure 23 on the adjacent face of one of the gears —131—, in this instance the one which is coaxial with the gear —132— Figure 18, to prevent rotation of the gears —131— and wick feeding wheels —129— as the rack —133— and gear —132— are moved in the opposite direction.

It is now evident that during each downward movement of the head —21— and toothed rack —133— carried thereby the wick-feeding wheels —129— will feed the wick downwardly a predetermined distance in this instance slightly greater than the axial length of the candle body.

It is preferable to employ two of the reels —125—, one for each of the carriers —19—, and a corresponding number of wick-feeding devices and guide tubes.

The wicks are preferably fed from each reel by pairs of primary feeding wheels —137— and gears —137′—, those of each pair being mounted upon parallel cross shafts —138— and —138′— which are journaled in suitable brackets —139— on the upright frame sections —126— in a plane some distance above the head —21— and upper ends of the guide tubes —127— with their meeting faces in vertical alinement with the corresponding guide tubes, as shown more clearly in Figures 2 and 13.

One of the shafts as —138— is provided with a pulley —140— connected by a belt —141— to a companion pulley —107′— on the cross shaft —104— for continuously rotating the wick-feeding wheels —137— in the direction indicated by the arrows and thereby continuously drawing the wicks downwardly from the corresponding reels.

Owing to the fact that the feeding of the wicks from the reels is substantially continuous and that the action of the wick feeding wheels —129— for feeding the wicks into the previously broached holes in the candle bodies is intermittent the portion of the wicking between the feeding wheels —137— and guide tubes —127— will be intermittently slackened and, therefore, deflected to one side of a direct path but this intermittent feeding motion of the wheels —129— is so timed in relation to the motion of the feeding wheels —137— as to take up this slack in the wicking as it is drawn by the feeding wheels —129— through the guide tubes —127— and then forced into the broached holes as —a′— of the registering candle body.

*Wick cutters.*

Associated with each pair of feeding wheels —129— is a suitable cutting mechanism for severing the wicks from the continuous cord after they have been fed through the broached holes of the candle bodies and for this purpose each of the brackets —128— is provided with a vertical bolt opening for receiving a bolt —143— yieldingly mounted thereon for relative vertical movement and carrying at its lower end a horizontal guide plate —144— in a plane below and extending across the vertical plane of the meeting edges of the adjacent feeding wheels —129— as shown in Figures 7, 19 and 24.

Associated with each of the guide plates —144— is an additional superposed guide plate —145— rigidly secured to the bracket —128— to form with the plate —144— a guideway for a horizontally reciprocating knife blade —146—.

The guide plate —145— also extends across the underside and beyond the meeting edges of the adjacent pair of wick-feeding wheels —129— and is provided with a vertical guide opening therethrough alined with the guide opening in the corresponding tube —127— for receiving the wick as it is fed into the broached hole in the underlying candle body —a—, as shown in Figures 7 and 19.

The portion of the guide plate —145— registering with the meeting faces of the feeding wheels —129— is provided in its underside with a hardened shearing member —147— through which the guide opening for the wick extends. The cutting edge of the shear blade is movable across and against the lower face of the adjacent hardened member —147— for shearing the wicks from the cord after they have been inserted into their respective candle bodies.

The bolt —143— carrying the guide plate —144— is spring-pressed upwardly by a coiled spring —148—, Figure 24, for holding the cutting blade —146— against the lower face of the hardened member —147— so as to assure close shearing cooperation between the cutting member and hardened member, see Figures 19 and 24.

The means for operating the knife from its normal to its cutting position comprises a lever or pawl —149— pivoted intermediate its ends at —149′— to the frame member —145— and having its lower end adapted to engage the outer end of the knife blade —146— and its upper end provided with a laterally projecting offset tooth —149″—.

The vertically movable head —21— is provided with a downwardly projecting post

—150— upon which a pawl —151— is pivoted at —151'—. This pawl —151— is adapted to engage the shoulder —149''— of the lever —149— during the upward movement of the head —21— from its lowermost position for forcing the knife blade —146— to its cutting position, said pawl being yieldingly held in its lever-engaging position by a spring —152— and has its upper end provided with an opening —153— for receiving a stop pin —154— which limits the outward movement of the upper end of the pawl but permits the inward movement of said pawl while riding against the inner face of the upper end of the lever —149— during the downward movement of the head —21—.

The outer end of the knife blade —146— is provided with a cross pin —155— extending beyond the opposite sides thereof and engaging the outer ends of a pair of parallel lengthwise pins —156— on the frame member —145—, said pins being spring-pressed outwardly by coiled springs —157—, Figure 21, for yieldingly holding the outer end of the knife blade —146— against the lower end of the lever —149— and also for retracting said knife blade and lever, which latter is limited in its outer movement by a stop pin —158—, Figures 7, 19 and 20.

Each carrier —19— is provided with a plurality of vertical guide openings —159— arranged in uniformly spaced relation circumferentially, one for each of the candle receiving holes —20— on the head —21— for receiving a pin —160— on the head —21— and holding the carrier against angular movement when the head —21— is lowered for broaching the candle body and applying the metal disks thereto.

The carrier —19— is also provided with a series of vertical openings —133'— arranged in uniformly spaced relation circumferentially, one for each of the candle-receiving holes —20— and adapted to permit the toothed rack —133— to pass therethrough when operated by the downward movement of the head for actuating the wick-feeding wheels —129—, see Figures 15 and 17.

When the candle bodies —a— are shifted by the angular movement of the carrier —19— to bring them into registration with the candle wick guide —127— the bolt —143— Figure 24 will be forced downwardly against the action of the spring —148— to cause the plate —144— to engage and press the intervening disk —b— flatwise against the upper face of the candle body as shown in Figure 7 to cause the prongs to enter the same and to simultaneusly aline the central opening —c— of said disk with the wick-guide whereupon the operation of the wick-feeding wheels —129— will cause the wick to be fed from the guide tube —127— through the central opening in the hardened member —147— and across the cutting edge of the knife blade —146— and thence through the opening in the disk —b— into and through the previously broached opening —a'— in the inderlying candle body.

The means for forcing the bolt —143— downwardly comprises a screw —161— engaged in a threaded aperture in the head —21— in vertical alinement with said bolt so that the latter will be depressed by said screw at each downward movement of said head, as shown in Figure 24.

During the application of the disks —b— to the candle bodies as shown in Figure 7, said candle bodies are supported upon a rest —123'— which, in turn, is spring-pressed downwardly by coiled spring —123''— and has its lower end engaged with a yielding tappet —124'— similar to the tappets —124— and —85—, previously described, the spring as —124''— serving to yieldingly hold the rest —123'— upwardly and thereby to assist in forcing the candle body into its tapered socket —20— in the carrier —19—.

The lower end of the post —150— on the head —21— serves as an ejector for ejecting the candle bodies from their respective openings —20— as they are brought into vertical alinement with the ejector by the angular movement of the carrier —19—.

Referring again to the mechanism for shifting the metal disks into alinement with the openings —20— in the carriers suitable means is provided for engaging the edges of the disks as they are shifted laterally for forcing the opposite edges of the disks between the spring clips —120— and underlying portions —127— of the shuttle to assure the retention of the disks in the shuttle during the transfer, said means consisting in this instance of a pair of rock arms —98'— pivoted by bolts —99'''— to the frame members —99— so that their free ends may project into the path of movement of the opposite ends of the shuttle —97— as shown more clearly in Figures 9 and 25.

These rock arms —98'— are held in their normal positions by coiled springs —99''—, Figure 25, and when the shuttle is moved in either direction the free ends of the rock arms —98'— will be engaged by the disks which, in turn, will be driven more or less tightly under the clips —120— by reason of the tension of the spring —99''— and as the shuttle continues to move in the same direction the rock arm —98'— engaged will be rocked about the axis of its pivot —99'''— to one side of the path of movement of the shuttle —97—, as shown more clearly in Figure 9.

*Operation.*

As the candle bodies —a— are fed by gravity down the inclined chute —22— they are picked up one by one by the rotary conveyor —27— and deposited upon the belt —30— and along the guide —41— to the pick-up drum —44— by which they are pickedup one by one by means of the arms —45— with their larger ends uppermost and are then trailed forwardly over the extension —46'— and desposited in an inverted position with their larger ends downwardly into the chute —46— which conducts them in this position on to the underlying registering platform of the shuttle —56—.

It is to be understood that the carriers —19— at opposite ends of the shuttle will always be stopped in such position that two of the candle body openings —20— will be in transverse alinement with the shuttle —56— and lower end of the tube —46— so that when the candle body is deposited on the platform —58— on one end of the shuttle and the shuttle is moved in that direction it will transfer the candle body to a position beneath the opening —20— in the corresponding carrier —19—.

Then, as the head —62— is raised by the corresponding cam —66— its plunger —61— will force said candle body into the opening —20— in the carrier —19—, as shown at the extreme left hand of Figure 7.

The carrier —19— will then be shifted rotarily one hole space in the manner described for registering the previously inserted candle body with the broaching die —82— after which the corresponding plunger rod —17— carrying the head —21— and broaching die —82— will be drawn downwardly by its crank disk —15— for broaching the hole —a'— through the center of the candle, it being understood that the plunger —17— and head —21—, together with the broaching die —82—, will then be elevated to its starting position.

The carrier —19— is again shifted rotarily one hole space to bring the previously broached candle body —a— into vertical alinement with the plunger —121— on the head —21— at which time one of the metal disks as —b— will have been fed to and temporarily held in a position directly over the upper end of the previously broached candle body by means of the shuttle —97—.

That is, the metal disks are deposited one by one in succession upon the belt —94— which carries them inwardly and deposits them singly upon the registering end of the shuttle —97— which, in turn, is actuated simultaneously with the shuttle —56— to feed the disk deposited thereon directly over the previously broached candle —a— in vertical alinement with the plunger —121—.

Then, when the head —21— is drawn downwardly by its crank disk —15— the plunger —121— will force the registering disk —b— into engagement with the top of the underlying candle body with its central opening —c— registering with the broach hole —a'—.

The carrier —19— is again shifted one hole space to bring the broached candle body with the disk thereon into vertical alinement with the wick guide —127— through which the wick is fed by the feeding wheels —129— through the registering openings in the underlying disk —b— and candle body —a—, it being understood that the wick is first drawn downwardly from the reel —125— by the feeding wheels —137— so as to produce a slight slack therein before feeding through the tube —127— as shown by dotted lines in Figure 2.

After the wick has been inserted through the disk —b— and candle body —a— and during the return upward movement of the head —21— the cutter blade —146— will be operated to sever the wick from the main body of the cord by reason of the engagement of the pawl —151— with the lever —149—.

After the head —21— has been again returned upwardly the carrier —19— carrying the candle body to which the disk and wick has been previously applied is again shifted to the position shown at the extreme right hand of Figure 7 to bring the candle body and disk thereon into vertical alinement with the ejector —150— which upon the downward movement of the head —21— discharges the completed candle with the disk and wick thereon from the carrier —19—.

These several operations are repeated as the candle bodies are successively fed into registration with the openings —20— in both of the carriers —19—, it being understood that the shuttles —56— and —97— act upon the candles and disks in both directions of their movement.

It will also be observed that during this last shifting movement of the candle body with the wick and disk thereon the lower end of the wick will trail across the upper end of the adjacent rest —123'— while the upper end of the wick will bear against the underside of the guide —145— thereby deflecting both ends of the wicks toward the body of the candle as shown in Figure 7.

The small ends of the candle bodies are formed with a slightly tapered central socket when the candle bodies are molded so as to indicate the position at which time wickhole —a'— is to be made and also to facilitate the centering of the central prongs —b'— and aperture —c— of the plate —b— with the opening —a— during the application of the plates to the candle bodies.

The object of the pilot —s— on the lower end of the plunger —121—, Figure 7, is to enter the opening —c— of the metal disk and wick-opening —a'— in the candle body so as to spread the prongs —b'— sufficient to allow the wick to pass easily through the opening —c— and into the wick opening —a'— when fed downwardly by the feeding coils —129—, Figure 7.

After the wick has been fed into the opening —a'— in the candle body and through the opening —c— of the disk —b— thereon the pressure of the member —144— upon the disk or plate to cause its prongs to enter the adjacent end of the candle body also causes the prongs —b'— to be forced inwardly toward each other into engagement with the wick to hold the latter against accidental endwise displacement in the candle body.

What I claim is:—

1. In a machine for applying base plates and wicks to candle bodies, means for feeding the candle bodies one by one to different positions, means for broaching a wick-receiving hole in the candle body when in one position, means for applying the base plates one by one to the broached candle bodies when brought to another position, and means for feeding the wicks one by one through the base plate and broached-hole of the candle-body.

2. In a machine for applying base plates and wicks to candle bodies, means for feeding the candle bodies one by one to different positions, means for broaching a wick-receiving hole in the candle body when in one position, means for applying the base plates one by one to the broached candle bodies when brought to another position, means for feeding a wick-cord through the base plate and candle body after the base plate is registered with said body, and means for severing the cord near one end of the candle body.

3. In a machine for applying wicks to candle bodies, means for feeding the candle bodies one by one to different positions, means for broaching a wick-receiving hole in the candle body when in one position, and means for feeding the wicks one by one into the candle body when brought to another position.

4. In a machine for applying wicks to candle bodies having wick-receiving holes therethrough, means for feeding the candle bodies to different positions, means for feeding the wicks one by one through the candle bodies as they are brought to one position, and means for displacing the candle bodies with the wicks therein from the first-named feeding means as brought to another position.

5. In a machine for applying wicks to candle bodies, a broaching tool, means for feeding the candle bodies one by one into and out of registration with said tool, means for operating the tool to broach a wick-receiving hole in the registering candle body, and means for feeding a wick into the broached body when moved out of registration with the broaching tool.

6. In a machine for applying wicks to candle bodies, a broaching tool, means for feeding the candle bodies one by one into and out of registration with said tool, means for operating the tool to broach a wick-receiving hole in the registering candle body, means for feeding a wick-cord through the broached body when moved out of registration with said tool, and means for severing the cord at one end of the candle body after it has been fed through said body.

7. In a machine for applying apertured base plates to candle bodies, means for feeding said bodies one by one to and from a predetermined position, and means for feeding and applying the plates one by one to one end of the candle-bodies as they are successively brought to said position.

8. In a machine for applying wicks to candle bodies, means for feeding said bodies one by one to different positions, means for broaching holes in the candle bodies as they are brought to one position, means for feeding a wick through said hole as the candle bodies are moved to another position, and means for severing the wick at one end of the candle body.

9. In a machine for applying base plates and wicks to candle bodies, a broaching tool, a plate applying tool and a wick guide all arranged spaced relation in sequence, means for successively feeding the candle-bodies one by one into and out of registration with said tools and wick guide, means for feeding the plates one by one into registration with the plate-applying tool, means for reciprocating said tools to broach a hole in and to apply the plates to the registering candle bodies, and means for feeding the wicks into candle body registering with said guide.

10. A rotary carrier having a series of candle-receiving sockets arranged in uniformly spaced relation circumferentially, means for shifting the carrier rotarily one socket-space at a time, means for feeding the candle bodies one by one into said sockets as they are brought to a certain position, means for broaching holes in said bodies as they are brought to another position, means for applying the plates to one end of the candles as they are brought to a third position, and means for feeding the wicks through the holes as the candle bodies are brought to a fourth position.

11. A rotary carrier having a series of candle-receiving sockets arranged in uniformly spaced relation circumferentially, means for shifting the carrier rotarily one socket-space at a time, means for feeding the candle bodies one by one into said sockets as they are brought to a certain position, means for broaching holes in said bodies as they are brought to another position, means for applying the plates to one end of the candles as they are brought to a third position, means for feeding a wick-cord through the holes as the candle bodies are brought to a fourth position, means for severing the cord at one end of the candle body while in the last-named position, and means for ejecting the candle bodies with the plates and wicks thereon from the sockets as said bodies are brought to a fifth position.

12. In a machine for broaching candle bodies, a broaching tool, a carrier having a series of sockets, means for shifting the carrier one socket space at a time to register the sockets with the said tool, means for feeding the candle bodies into said sockets as the latter are successively shifted to a certain position, and means for operating the broaching tool to form wick-receiving holes in the registering candles.

13. In a machine for broaching candle bodies, a broaching tool, a carrier having a series of sockets, means for shifting the carrier one socket space at a time to register the sockets with the said tool, means for feeding the candle bodies into said sockets as the latter are successively shifted to a certain position, and means for operating the broaching tool to form wick-receiving holes in the registering candles, and means for feeding wicks into the holes of said candle bodies as the latter are shifted to a certain position.

14. In a machine for broaching candle bodies, a broaching tool, a carrier having a series of sockets, means for shifting the carrier one socket space at a time to register the sockets with the said tool, means for feeding the candle bodies into said sockets as the latter are successively shifted to a certain position, and means for operating the broaching tool to form wick-receiving holes in the registering candles, and means for feeding wicks into the holes of said candle bodies as the latter are shifted to a certain position, and means for applying base plates to one end of the candle bodies as the latter are shifted to a certain position by the carrier.

15. In a machine for applying wicks to candle bodies, a carrier having a socket for receiving the candle body, means for feeding a candle into the socket, means for intermittingly moving the carrier with the candle thereon from its candle-body receiving position to other different positions, means for broaching a wick hole through the candle body when brought to another position, and means for feeding a wick into said hole when the candle body is brought to a different position.

16. In a machine for applying base plates and wicks to one end of candle bodies, a carrier, means for depositing a candle body into the carrier to be supported thereby, means for intermittingly moving the carrier to bring the candle body to different positions, means for broaching a wick hole through the candle body while the candle body is in one position, means for applying the base plate to the candle body while in another position, and means for feeding a wick into the wick hole of the candle body when the latter is brought to a different position.

17. In a candle assembling machine, a pair of carriers rotatable in a horizontal plane about parallel vertical axes, an upright delivery tube for the candle bodies disposed substantially midway between the axes of rotation of the carriers, a shuttle reciprocally movable transversely of and below the lower end of the delivery tube and having its opposite ends alternately registerable with said tube as the shuttle is reciprocated, means for reciprocating the shuttle to alternately displace the candles delivered thereto from the tube, and means for transferring the candles from the shuttle to said carriers.

18. In a candle assembling machine, an upright delivery tube, a hopper in which the candle bodies are placed promiscuously, a conveyor belt, means for transferring the candle bodies one by one from the hopper on to the conveyor belt, and means for transferring the candle bodies one by one from the conveyor belt into the delivery tube.

19. In a candle assembling machine of the character described, a hopper for receiving pronged base plates for the candle bodies, a conveyor belt, and means for transferring the base plates from the hopper on to the conveyor belt including means for arranging the plates with their prongs facing the belt as they are successively delivered on to said belt.

20. In a candle assembling machine of the character described, a pair of carriers rotatable in a horizontal plane about parallel vertical axes, an upright delivery tube, means for feeding the candle bodies one by one into the delivery tube, and means for successively transferring the candle bodies from the delivery tube, first to one and then to the other of the carriers.

In witness whereof I have hereunto set my hand, this 13th day of February, 1928.

LLOYD W. MOULTON.